US000001889H

United States Statutory Invention Registration [19]

[11] Reg. Number: H1,889

Lin et al.

[45] Published: Oct. 3, 2000

[54] TONER COMPOSITIONS

[75] Inventors: Pinyen Lin; George R. Hsu, both of Rochester, N.Y.

[73] Assignee: Xerox Corporation, Stamford, Conn.

[21] Appl. No.: 09/414,935

[22] Filed: Oct. 12, 1999

[51] Int. Cl.[7] ..... G03G 9/00

[52] U.S. Cl. ..... 430/110

[58] Field of Search ..... 430/110

[56] References Cited

U.S. PATENT DOCUMENTS

| | | | |
|---|---|---|---|
| 3,590,000 | 6/1971 | Palermiti et al. | 430/110 |
| 3,893,935 | 7/1975 | Jadwin et al. | 430/110 |
| 3,900,588 | 8/1975 | Fisher | 430/125 |
| 3,944,493 | 3/1976 | Jadwin et al. | 430/109 |
| 4,007,293 | 2/1977 | Mincer et al. | 430/107 |
| 4,079,014 | 3/1978 | Burness et al. | 430/110 |
| 4,221,856 | 9/1980 | Lu | 430/110 |
| 4,298,672 | 11/1981 | Lu | 430/108 |
| 4,312,933 | 1/1982 | Lu | 430/122 |
| 4,338,390 | 7/1982 | Lu | 430/106 |
| 4,394,430 | 7/1983 | Jadwin et al. | 430/110 |
| 4,560,635 | 12/1985 | Hoffend et al. | 430/106.6 |
| 5,229,242 | 7/1993 | Mahabadi et al. | 430/110 |
| 5,486,445 | 1/1996 | Van Dusen et al. | 430/110 |
| 5,814,428 | 9/1998 | Kido et al. | 430/110 |
| 5,843,612 | 12/1998 | Lin et al. | 430/110 |
| 5,935,750 | 8/1999 | Barbetta et al. | 430/106.6 |
| 5,958,642 | 9/1999 | Takagi et al. | 430/110 |

*Primary Examiner*—Charles T. Jordan
*Assistant Examiner*—Aileen J. Baker
*Attorney, Agent, or Firm*—Eugene O. Palazzo

[57] ABSTRACT

A toner comprised of resin, colorant, grinding compound, and wax.

49 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TONER COMPOSITIONS

COPENDING APPLICATIONS AND PATENTS

Illustrated in copending applications U.S. Ser. No. 09/132,188, the disclosure of which is totally incorporated herein by reference, is a toner comprised of resin, colorant, optional wax and a coated silica, and a coating comprised of an alkylsilane; and U.S. Ser. No. 09/132,185, the disclosure of which is totally incorporated herein by reference, is a toner with a resin, wax, and a coated silica with, for example, certain BET characteristics.

Also, toners containing waxes, such as polyethylenes, polypropylenes, especially low molecular weight waxes, with for example a $M_w$ of form about 1,000 to about 20,000 are illustrated in copending application U.S. Ser. No. 09/258,916, the disclosure of which is totally incorporated herein by reference, and toners with waxes and compatibilizers are illustrated in copending application U.S. Ser. No. 09/259,448, the disclosure of which is totally incorporated herein by reference.

Carriers which when admixed with toner forms a developer are illustrated for example in U.S. Ser. No. 09/140,594, U.S. Ser. No. 09/140,439, U.S. Ser. No. 09/140,524, and U.S. Pat. No. 5,945,244 and U.S. Pat. No. 5,935,750, the disclosures of which are totally incorporated herein by reference.

The appropriate components and processes of the above copending applications, may be selected for the present invention in embodiments thereof.

BACKGROUND OF THE INVENTION

The present invention is generally directed to toner and developer compositions, and more specifically, the present invention is directed to positively, or negatively charged toner compositions, or toner particles containing waxes, especially a mixture of two waxes, such as a mixture of polypropylene and polyethylene, binder, and a grinding component of for example a polyalkenylalkyl, such as polyisopropenyl toluene. The grinding component is, for example, a material preferably contained in the toner melt mix process and remains within the toner particles, and which grinding component provides stable toner charge against a carrier or a charging blade, stable and, for example, finely dispersed wax domains in the toner, and a high grinding process speed for the toner generation. Moreover, the toners of the present invention, which are preferably negatively charged, may contain toner additives, such as charge additives, and preferably as surface additives metal salts of fatty acids, metal salts, metal oxides, flow additives such as silicas, silicon dioxides, and the like and for example coated silicas available from Cabosil, and more specifically these silicas preferably possess a primary particle size of about 25 nanometers to about 55 nanometers and an aggregate size of about 225 nanometers to about 400 nanometers. With the toners of the present invention, in embodiments thereof a number of advantages are achievable, such as excellent stable triboelectric charging characteristics, substantial insensitivity to humidity, especially humidities of from about 20 to about 80 weight percent, superior toner flow through, acceptable triboelectric charging values, such as from about 15 to about 55 microcoulombs per gram as determined, for example, by the known Faraday Cage, and wherein the toners enable the generation of developed images with superior resolution, and excellent color intensity. The aforementioned toner compositions can contain colorants, such as dyes or pigments comprised of, for example, carbon black, magnetites, or mixtures thereof, cyan, magenta, yellow, blue, green, red, or brown components, or mixtures thereof, thereby providing for the development and generation of black and/or colored images, and in embodiments the toner can be selected for two component development and single component development wherein a carrier or carrier particles are avoided. Preferably the toner is admixed with carrier to form a developer and wherein the carrier is preferably conductive.

The toner and developer compositions of the present invention can be selected for electrophotographic, especially xerographic, imaging and printing processes, including color, digital processes, multisystems apparatus and machines such as for example from about 35 to about 65 page per minute black and white multi-functional digital devices and machines.

PRIOR ART

Toner compositions with certain surface additives, including certain silicas, are known. Examples of these additives include colloidal silicas, such as certain AEROSILS like R972® available from Degussa, metal salts and metal salts of fatty acids inclusive of zinc stearate, aluminum oxides, cerium oxides, and mixtures thereof, which additives are each generally present in an amount of from about 1 weight percent by weight to about 5 weight percent by weight, and preferably in an amount of from about 1 weight percent by weight to about 3 weight percent by weight. Several of the aforementioned additives are illustrated in U.S. Pat. Nos. 3,590,000 and 3,900,588, the disclosures of which are totally incorporated herein by reference. Also known are toners containing a mixture of hexamethyldisilazane (HMDZ) and APTES, an aminopropyltriethoxysilane.

Further toner compositions with charge enhancing additives, which impart a positive charge to the toner resin, are also known. Thus, for example, there is described in U.S. Pat. No. 3,893,935 the use of quaternary ammonium salts as charge control agents for electrostatic toner compositions. U.S. Pat. No. 4,221,856 discloses electrophotographic toners containing resin compatible quaternary ammonium compounds in which at least two R radicals are hydrocarbons having from 8 to about 22 carbon atoms, and each other R is a hydrogen or hydrocarbon radical with from 1 to about 8 carbon atoms, and A is an anion, for example sulfate, sulfonate, nitrate, borate, chlorate, and the halogens, such as iodide, chloride and bromide, reference the Abstract of the Disclosure and column 3; and a similar teaching is presented in U.S. Pat. No. 4,312,933, which is a division of U.S. Pat. No. 4,291,111; and similar teachings are presented in U.S. Pat. No. 4,291,112 wherein A is an anion including, for example, sulfate, sulfonate, nitrate, borate, chlorate, and the halogens. There are also described in U.S. Pat. No. 2,986,521 reversal developer compositions comprised of toner resin particles coated with certain finely divided colloidal silica. According to the disclosure of this patent, the development of electrostatic latent images on negatively charged surfaces is accomplished by applying a developer composition having a positively charged triboelectric relationship with respect to the colloidal silica.

Also, there is disclosed in U.S. Pat. No. 4,338,390, the disclosure of which is totally incorporated herein by reference, developer compositions containing as charge enhancing additives organic sulfate and sulfonates, which additives can impart a positive charge to the toner composition. Further, there is disclosed in U.S. Pat. No. 4,298,672, the disclosure of which is totally incorporated herein by reference, positively charged toner compositions with resin particles and pigment particles, and as charge enhancing additives alkyl pyridinium compounds. Additionally, other documents disclosing positively charged toner compositions with charge control additives include U.S. Pat. Nos. 3,944,493; 4,007,293; 4,079,014; 4,394,430 and 4,560,635 which illustrates a toner with a distearyl dimethyl ammonium methyl sulfate charge additive.

Moreover, toner compositions with negative charge enhancing additives are known, reference for example U.S. Pat. Nos. 4,411,974 and 4,206,064, the disclosures of which are totally incorporated herein by reference. The '974 patent discloses negatively charged toner compositions comprised of resin particles, pigment particles, and as a charge enhancing additive ortho-halo phenyl carboxylic acids. Similarly, there are disclosed in the '064 patent toner compositions with chromium, cobalt, and nickel complexes of salicylic acid as negative charge enhancing additives.

There is illustrated in U.S. Pat. No. 4,404,271 a toner that contains a metal complex represented by the formula in column 2, for example, and wherein ME can be chromium, cobalt or iron. Additionally, other patents disclosing various metal containing azo dyestuff structures wherein the metal is chromium or cobalt include 2,891,939; 2,871,233; 2,891,938; 2,933,489; 4,053,462 and 4,314,937. Also, in U.S. Pat. No. 4,433,040, the disclosure of which is totally incorporated herein by reference, there are illustrated toner compositions with chromium and cobalt complexes of azo dyes as negative charge enhancing additives. These and other charge enhancing additives, such as these illustrated in U.S. Pat. Nos. 5,304,449, 4,904,762, and 5,223,368, the disclosures of which are totally incorporated herein by reference, may be selected for the present invention in embodiments thereof.

SUMMARY OF THE INVENTION

Examples of features of the present invention in embodiments thereof include:

It is a feature of the present invention to provide toner and developer compositions with a number of advantages.

In another feature of the present invention there are provided negatively charged toner compositions useful for the development of electrostatic latent images including color images.

In yet another feature of the present invention there are provided negatively charged environmental acceptable toner compositions useful for the development of electrostatic latent images including full process color images.

In another feature of the present invention there are provided developers comprised of toner and carrier and wherein the toner preferably contains a grinding component, or a grinding agent.

Also, in another feature of the present invention there are provided toners that enable toner unimodal charge distribution as measured by a charge spectrograph.

Further, in another feature of the present invention there are provided toners that enable an unimodal charge distribution upon admix of fresh toner into aged toner as measured by a charge spectrograph.

Other features of the present invention include providing toner and developer compositions that enable acceptable high stable negative triboelectric charging characteristics from for example about 15 to about 60 microcoulombs per gram, and preferably from about 25 to about 40 microcoulombs per gram; toner and developer compositions that permit humidity insensitivity, from about, for example, about 20 to about 80 weight percent relative humidity at temperatures of from about 60 to about 80° F. as determined in a relative humidity testing chamber; toner and developer that enable negatively charged toner compositions with desirable admix properties of about 1 second to about 60 seconds as determined by a charge spectrograph, and more preferably less than about 30 seconds; toner compositions that provide for example, low temperature fusing resulting in high quality black and or color images; and toners which will enable the development of images in electrophotographic imaging apparatuses, which images have substantially no background deposits thereon, are substantially smudge proof or smudge resistant, and therefore are of excellent resolution.

In another feature of the present invention there are provided negatively charged toner compositions useful for the development of electrostatic latent images including color images.

In yet a further feature of the present invention there are provided humidity insensitive, from about, for example, 20 to 80 weight percent relative humidity at temperatures of from 60 to 80° F. as determined in a relative humidity testing chamber, positively charged toner compositions with desirable admix properties of about 5 seconds to about 60 seconds as determined by the charge spectrograph, and preferably less than about 15 seconds for example, and more preferably from about 1 to about 14 seconds, and acceptable high stable triboelectric charging characteristics of from about 20 to about 50 microcoulombs per gram.

Another feature of the present invention resides in the formation of toners which will enable the development of images in electrophotographic imaging apparatuses, which images have substantially no background deposits thereon, are substantially smudge proof or smudge resistant, and therefore are of excellent resolution; and further, such toner compositions can be selected for multifunctional digital apparatuses with speeds of form about 30 to about 70, and preferably form about 35 to about 55 copies per minute.

The present invention in embodiments relates to a toner comprised of binder polymer, or resin, wax, or waxes, and preferably a mixture of two waxes, charge additives, and a grinding component of preferably polyisopropenyl toluene and developers thereof wherein the carrier is preferably a magnetic carrier comprised of a core, a coating of a polymer, such as polymethylmethacrylate, and the like, and preferably a mixture of polymers as illustrated hereinafter, and which mixtures for example are comprised of polymethylmethacrylate and polyvinylidene fluoride, or KYNAR®, and wherein the polymer coating may contain therein a conductive component, such as a conductive carbon black. Preferably the carrier is conductive, that is the carrier possesses a conductivity of from about $10^{-6}$ to about $10^{-10}$ (ohm-cm)$^{-1}$ and preferably about $10^{-7}$ to about $10^{-9}$ (ohm-cm)$^{-1}$ and a breakdown potential of no more than 500 volts and, for example, from about 10 volts to about 500 volts, as determined in a conductivity cell, reference U.S. Pat. No. 5,196,803, the disclosure of which is totally incorporated herein by reference, and wherein in embodiments the developer tribo is from about −10 to about −30 and preferably from about −12 to about −22 microcoulombs per gram, and there is enabled a high level of developer flow, for example from about 7 to 15 grams per minutes in a flow tube tester.

Aspects of the present invention relate to a toner comprised of resin, colorant, wax, toner grinding or dispersing agent, and a coated silica, and wherein the silica has a primary particle size of about 25 nanometers to about 55 nanometers and an aggregate size of about 225 nanometers to about 400 nanometers, and wherein the coating is comprised of a mixture of an alkylsilane and an aminoalkylsilane; a toner wherein the silica coating is generated from a mixture of about 10 weight percent to 25 weight percent of an alkylalkoxysilane and about 0.10 weight percent to about 5 weight percent of an aminoalkylalkoxysilane; a toner wherein the toner further contains surface additives of metal oxides, metal salts, metal salts of fatty acids, or mixtures thereof; a toner wherein the toner further contains surface additives of titania, metal salts of fatty acids, or mixtures thereof; a toner wherein the resin is polyester; a toner wherein the resin is a polyester formed by condensation of propoxylated bisphenol A and a dicarboxylic acid; a toner wherein the resin is comprised of a mixture of a polyester formed by condensation of propoxylated bisphenol A and fumaric acid, and a gelled polyester formed by condensation of propoxylated bisphenol A and fumaric acid; a toner wherein the colorant is carbon black, cyan, magenta, yellow, red, orange, green, violet, or mixtures thereof; a toner wherein the silica is coated with a mixture of a decylsilane and aminopropylsilane; a toner wherein alkyl contains from about 1 to, about 25 carbon atoms; a toner wherein alkyl is butyl, hexyl, octyl, decyl, dodecyl, or stearyl; a toner wherein the silica is coated with a polymer mixture of (1) an alkylsilane, and (2) an aminoalkylsilane; a toner wherein the titania or titanium dioxide is coated with an alkylsilane; a toner wherein the titania is coated with decylsilane; a toner wherein the colorant is preferably a black pigment; a toner wherein the coated silica is present in an amount of from about 1 weight percent to about 10 weight percent; a toner wherein the coated silica is present in an amount of from about 4 weight percent to about 10 weight percent; a toner wherein the titania is present in an amount from about 1 weight percent to about 5 weight percent, or wherein the titania is present in an amount from about 1.5 weight percent to about 3.5 weight percent; a toner wherein the metal salt is zinc stearate and is present in an amount from about 0.10 weight percent to about 0.60 weight percent; a toner with a triboelectric charge of from about 15 to about 55, or with a triboelectric charge of from about 25 to about 40; a toner wherein the resin is present in an amount of from about 85 weight percent to about 99 weight percent and the colorant is present in an amount from about 15 weight percent to about 1 weight percent; a developer comprised of toner and carrier; a developer with a unimodal charge distribution as measured by a charge spectrograph; and a toner further containing a charge additive, a wax, or mixtures thereof; a toner wherein the silica coating is a polymer, and this coating is contained on a silicon dioxide core; a toner wherein the silica coating is represented by the formula

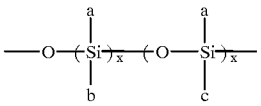

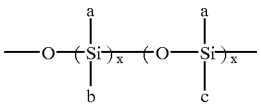

and thereby optionally enables, for example, a crosslinked formula or structure; the repeating segment above, and hydroxy or hydroxy groups; the repeating segment above, and alkoxy or alkoxy groups; or the repeating segment above, and hydroxy and alkoxy groups; b is alkyl with, for example from 1 to about 25, and more specifically, from about 5 to about 18 carbon atoms, and x represents the number of segments and is, for example, a number of from 1 to about 1,000 and more specifically, from about 25 to about 500, and wherein c is an aminoalkyl, wherein alkyl contains for example from about 1 to about 25 carbon atoms, and wherein c is more specifically an aminopropyl; a toner wherein the silica coating is comprised of a polymer mixture of decylsilane and aminopropylsilane; toners comprised of a binder, such as resin particles, colorant, and surface additives comprised of a mixture of certain silicas, metal oxides, such as titanias, especially titanium dioxides, and certain conductivity aides such as metal salts of fatty acids, such as zinc stearate; and toner compositions comprised of binder, colorant, a grinding agent, optional additives such as charge additives, optional surface additives such as certain titanias and conductivity aides such as zinc stearate, and a surface additive comprised of silica coated with a mixture of an alkylsilane, such as decylsilane and aminopropylsilane, each present in the mixture as a coating on the silica in various suitable amounts.

Also, in aspects thereof the present invention relate to a toner comprised of resin, colorant, grinding compound, and wax; a toner wherein said wax is comprised of a mixture of waxes; a toner wherein said wax is comprised of a mixture of from about two to about four waxes; a toner wherein said wax is comprised of a mixture of from two waxes; a toner wherein said wax is comprised of a mixture of two waxes, a first wax present in an amount of from about 40 to about 90 weight percent and a second wax present in an amount of from about 10 to about 60 weight percent; a toner wherein said wax is comprised of a mixture of two waxes, a first wax present in an amount of from about 45 to about 80 weight percent and a second wax present in an amount of from about 20 to about 55 weight percent; a toner wherein said wax is comprised of a mixture of two waxes of polypropylene and polyethylene; a toner wherein said polypropylene possesses a weight average molecular weight $M_w$ of from about 5,000 to about 20,000; a toner wherein said polyethylene possesses an $M_w$ of from about 1,000 to about 10,000; a toner wherein said polypropylene possesses an $M_w$ of from about 5,000 to about 20,000 and said polyethylene possesses an $M_w$ of from about 1,000 to about 10,000; a toner wherein said grinding compound is an isopropenyl toluene-butene copolymer or an isopropenyl toluene-pentene copolymer; a toner wherein said grinding compound is an isopropenyl toluene copolymer with unsaturated hydrocarbons of about 2 to about 8 carbons; a toner wherein said resin is present in amount of from about 65 to about 85 weight percent and wherein the total of said toner components is about 100 percent; a toner wherein said resin is present in an amount of from about 70 to about 80 weight percent and wherein the total of said toner components is about 100 percent; a toner wherein said resin is a styrene acrylate, a styrene methacrylate, or mixtures thereof; a toner wherein said resin is a polyester; a toner wherein said resin is an extruded polyester, or a crosslinked polyester; a toner wherein said grinding agent is present in an amount of from about 3 to about 15 weight percent; a toner wherein said grinding agent is present in an amount of from about 7 to about 10 weight percent; a toner wherein said colorant is a pigment, a dye or mixtures thereof; a toner containing surface additives; a toner wherein said surface additives are comprised of silicas, metal oxides, or fatty acid salts; a toner wherein said surface additives are comprised of a mixture of silicas and titanium oxides; a toner wherein each of said surface additives are present in an amount of from about 0.5 to about 3 weight percent; a toner wherein said surface additives are present in an amount of from about 0.5 to about 3 weight percent; a toner with a negative charge; a toner further containing surface additives of a coated silica, and wherein said silica has a primary particle size of about 25 nanometers to about 55 nanometers and an aggregate size of about 225 nanometers to about 400 nanometers, and said coating is comprised of a mixture of an alkylsilane and an aminoalkylsilane; a toner wherein said coating is generated from a mixture of about 10 weight percent to 25 weight percent of an alkylalkoxysilane and about 0.10 weight percent to about 5.0 weight percent of an aminoalkylalkoxysilane; a toner wherein the resin is a polyester formed by condensation of propoxylated bisphenol A and a dicarboxylic acid; a toner wherein the resin is comprised of a gelled polyester formed by condensation of propoxylated bisphenol A and fumaric acid; a toner wherein the colorant is carbon black, cyan, magenta, yellow, red, orange, green, violet, or mixtures thereof; a developer comprised of the toner of the invention and carrier; a developer wherein the carrier is comprised of a core and a polymer coating; a developer wherein the carrier is comprised of a core and a polymer coating mixture; a developer wherein said mixture is comprised of two to four polymers; a developer wherein said mixture is comprised of two polymers; a developer wherein said mixture is comprised of two to four polymers of polymethylmethacrylate and polyvinylidene fluoride; a developer wherein said polymer contains a conductive component dispersed therein; a developer wherein said polymer contains a conductive component dispersed therein in an amount of from about 20 to about 45 weight percent; a developer wherein said polymer contains a conductive component dispersed therein in an amount of from about 20 to about 65 weight percent and which component is carbon black; a developer with a conductivity of from about $10^{-6}$ to about $10^{-10}$ (ohm-cm)$^{-1}$ and a breakdown potential of no more than 500 volts and, for example, from about 10 volts to about 500 volts; a developer with a preferred conductivity of from about $10^{-7}$ to about $10^{-9}$ (ohm-cm)$^{-1}$; a process for the preparation of a toner comprising admixing resin, colorant, wax, and grinding compound; a process which comprises the formation of an image on an imaging member, and the development of said image with the toner of claim 1 and transferring the image to a substrate; a process which comprises the formation of an image on an imaging member, and the development of said image with the developer of the invention and transferring the image to a substrate; a toner wherein said isopropenyl toluene is meta isopropenyl toluene, ortho isopropenyl toluene, para isopropyl toluene or mixtures thereof; a toner wherein said hydrocarbon is butene, pentene, hexene, isopropylene, or butadiene; and a toner wherein said grinding component is an alkyl aryl polymer; a toner wherein said grinding component is polyalkenyl alkyl.

Of importance with respect to the toners of the present invention are the grinding agents or components, present in an amount of, for example, from about 5 to about 20 weight percent, from about 7 to about 12 weight percent and preferably from about 8 to about 10 weight percent. Examples of a preferred grinding agent is polyisopropenyl toluene. Toners containing the grinding components illustrated herein possess a number of advantages, including faster relative jetting rates, higher than about 2, for example about 2 to about 5, minimization, or elimination of toner flow reduction, or fall off, improved toner transfer, acceptable developed toner mass such as solid area density higher than about 1.40, such as about 1.45 to about 1.55, reduction in the amount of wax that escapes from the toner, and providing images with excellent resolution, and reduced background deposits such as background lower than about 2.6 like about 2.3 after extended imaging cycles.

The toner compositions of the present invention can be prepared by admixing and heating resin particles such as styrene polymers, polyesters, and similar thermoplastic resins, colorant, wax, especially low molecular weight waxes, grinding/dispersing compound, and charge enhancing additives, or mixtures of charge additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 8 to about 12 microns, which diameters are determined by a Coulter Counter. Subsequently, the toner compositions can be classified utilizing, for example, a Donaldson Model B classifier for the purpose of removing fines, that is toner particles less than about 4 microns volume median diameter. Thereafter, the surface additives are added by the blending thereof with the toner obtained.

Illustrative examples of suitable toner binders, include toner resins, especially polyesters, thermoplastic resins, polyolefins, styrene acrylates, such as PSB-2700 obtained from Hercules-Sanyo Inc., and preferably selected in the amount of about 65 weight percent, styrene methacrylate, styrene butadienes, crosslinked styrene polymers, epoxies, polyurethanes, vinyl resins, including homopolymers or copolymers of two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene and the like; saturated mono-olefins such as vinyl acetate, vinyl propionate, and vinyl butyrate; vinyl esters like esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; mixtures thereof; and the like, styrene butadiene copolymers with a styrene content of from about 70 to about 95 weight percent, reference the U.S. patents mentioned herein, the disclosures of which have been totally incorporated herein by reference. In addition, crosslinked resins, including polymers, copolymers, homopolymers of the aforementioned styrene polymers, may be selected.

As one toner resin, there are selected the esterification products of a dicarboxylic acid and a diol comprising a diphenol. These resins are illustrated in U.S. Pat. No. 3,590,000, the disclosure of which is totally incorporated herein by reference. Other specific toner resins include styrene/methacrylate copolymers, and styrene/butadiene copolymers; Pliolites; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, reactive extruded resin, especially reactive extruded polyesters with crosslinking as illustrated in U.S. Pat. Nos. 5,352,556, 5,376,494; 5,395,723; 5,401,602; and 5,227,460, the disclosures of which are totally incorporated herein by reference, styrene acrylates, and mixtures thereof. Also, waxes with a molecular weight $M_w$ weight average molecular weight of from about 1,000 to about 20,000, such as polyethylene, polypropylene, paraffin waxes, and preferably mixtures of polyethylene and polypropylene can be included in, or on the toner compositions as fuser roll release agents. The resin is present in a sufficient, but effective amount, for example from about 50 to about 90 weight percent.

Colorant includes pigment, dyes, mixtures thereof, mixtures of dyes, mixtures of pigments and the like present in suitable amounts such as from about 1 to about 20 and preferably from about 2 to about 10 weight percent. Colorant examples are carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like; cyan, magenta, yellow, red, green, brown, blue or mixtures thereof, such as specific phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL, and known suitable dyes, such as food dyes, red, blue, green, and the like.

Magnetites, when selected include a mixture of iron oxides ($FeO \cdot Fe_2O_3$), including those commercially available as MAPICO BLACK™, and can be present in the toner composition in various effective amounts, such as an amount of from about 10 weight percent by weight to about 75 weight percent by weight, and preferably in an amount of from about 30 weight percent by weight to about 55 weight percent by weight.

There can be included in the toner compositions of the present invention as indicated herein charge additives as indicated herein in various effective amounts, such as from about 1 to about 19, and preferably from about 1 to about 3 weight percent, and waxes, such as polypropylenes and polyethylenes commercially available from Allied Chemical and Petrolite Corporation, Epolene N-15 commercially available from Eastman Chemical Products, Inc., Viscol 550-P, a low weight average molecular weight polypropylene available from Sanyo Kasei K.K., and the like. The commercially available polyethylenes selected have a molecular weight of from about 1,000 to about 1,500, while the commercially available polypropylenes utilized are believed to have a molecular weight of from about 4,000 to about 7,000. Many of the polyethylene and polypropylene compositions useful in the present invention are illustrated in British Patent No. 1,442,835, the disclosure of which is totally incorporated herein by reference. The wax, preferably a mixture of waxes, is present in the toner composition of the present invention in various amounts, however, generally these waxes are present in the toner composition in an amount of from about 1 weight percent by weight to about 15 weight percent by weight, and preferably in an amount of from about 2 weight percent by weight to about 10 weight percent by weight. Preferably a mixture of waxes, such as tow waxes of polyethylene and polypropylene are selected wherein each wax is present in a suitable amount and the total amount of waxes is about 100 percent or parts, thus form about 1 to about 99, and preferably from about 35 to about 65 weight percent of one wax can be selected, and from about 99 to about 1, and preferably from about 65 to about 35 weight percent of a second wax can be selected and wherein the total of the two waxes is about 100 percent.

The toners of the present invention may also in embodiments thereof contain polymeric alcohols, such as UNILINS®, reference U.S. Pat. No. 4,883,736, the disclosure of which is totally incorporated herein by reference, and which UNILINS® are available from Petrolite Corporation.

Developers include the toners illustrated and carrier particles. Developer compositions can be prepared by mixing the toners with known carrier particles, including coated carriers, such as steel, ferrites, and the like, reference U.S. Pat. Nos. 4,937,166 and 4,935,326, the disclosures of which are totally incorporated herein by reference, for example from about 2 weight percent toner concentration to about 8 weight percent toner concentration. The carriers can include coatings thereon, such as those illustrated in the 4,937,166 and 4,935,326 patents, and other known coatings. There can be selected a single coating polymer, or a mixture of polymers. Additionally, the polymer coating, or coatings may contain conductive components therein, such as carbon black in an amount, for example, of from about 10 to about 70 weight percent, and preferably from about 20 to about 50 weight percent. Specific examples of coatings are fluorocarbon polymers, acrylate polymers, methacrylate polymers, silicone polymers, and the like. More specifically the carrier is comprised of a ferrite core with a mixture of coatings thereover, such as two polymers, reference the above patents, and preferably a polymer mixture of polymethylmethacrylate (PMMA) and polyvinylidene fluoride, in an amount of from about 40 to about 60 PMMA and from about 60 to about 40 polyvinylidene fluoride. The carrier coating weight is for example from about 0.5 to about 5 and preferably form about 1 to about 3 weight percent Dispersed in or added to the carrier coating is a conductive component of for example conductive carbon blacks available from Cabot Chemicals, and which conductive component is present for example in an amount of from about 5 to about 75, and preferably from about 20 to about 40 weight percent. The carrier conductivity, as measured by a conductivity cell, reference U.S. Pat. No. 5,196,803 is, for example, from about $10^{-6}$ to about $10^{-10}$ (ohm-cm)$^{-1}$ and preferably about $10^{-7}$ to about $10^{-9}$ (ohm-cm)$^{1}$ and a breakdown potential of no more than 500 volts and, for example, from about 10 volts to about 500 volts, and which conductivity enable, for example, the toner jumping from developer to the photoreceptor, and wherein in embodiments the developer tribo is from about −10 to about −30 and preferably from about −12 to about −22 microcoulombs per gram, and there is enabled a high level of developer flow, for example from about 7 to 15 grams per minutes in a flow tube tester. Carrier size can vary, for example the carrier diameter can be form about 35 to about 125 microns in average volume diameter as determined by a Coulter Counter, and preferably from about 50 to about 70 microns. The carrier is comprised of ferrite core, about 65 microns, with polymethylmethacrylate (PMMA) only or with a mixture of polymer coating, such as a polymer mixture of polymethylmethacrylate and polyvinylidene fluoride, in an amount of from about 50 to about 95 PMMA and from about 5 to about 50 polyvinylidene fluoride, which coating contains therein conductive components like carbon black such as VULCAN 72® in amount, for example, of from about 5 to about 40 and preferably about 20 weight percent. The carrier coating weight is for example from about 0.1 to about 4 and preferably form about 0.3 to about 2 weight percent.

Imaging methods are also envisioned with the toners of the present invention, reference for example a number of the patents mentioned herein, and U.S. Pat. Nos. 4,585,884; 4,584,253; 4,563,408 and 4,265,990, the disclosures of which are totally incorporated herein by reference.

The following Examples are being submitted to further define various pieces of the present invention. These Examples are intended to be illustrative only and are not intended to limit the scope of the present invention. Comparative Examples and data are also submitted.

EXAMPLE I

There was prepared a toner composition comprised of 82 percent by weight of a branched bisphenol A fumarate, polyester resin, where the estimated level of branched chains is between 15 and 40 percent, 4 percent by weight of the polypropylene wax VISCOL 660P™, available from Sanyo Chemicals of Japan, 1 percent by weight of the polyethylene wax PE130™, available from Hoechst Japan Ltd., 5 percent by weight of REGAL 330® carbon black from Cabot Inc., and 8 percent by weight of FTR6125 isopropenyl toluene-butene/pentene copolymer as the grinding component obtained from Mitsui Petrochemical Industries, Ltd. of Japan. The FTR6125 was reported to have a molecular weight $M_w$ of about 700 to about 2,100, measured by GPC.

The toner product resulting was extruded using a Werner & Pfleiderer ZSK-28 twin screw extruder at barrel set temperatures ranging from 90 to 120° C. at a throughput rate of 5 to 10 pounds/hour. The strands of melt mixed product exiting from the extruder were cooled by immersing them in a water bath maintained at room temperature, about 25° C. Subsequent to air drying, the resulting toner was pulverized and classified, and toner particles with a volume average diameter of about 4 to 9 microns as measured by a Coulter Counter were obtained. Relative jetting rates were calculated from collection yields with respect to a control toner with no grinding component, and found to be 2.5. The toner product (3 lb. load) was then blended with small-sized external additives of 0.2 weight percent TS-720 a hydrophobic treated fumed silica obtained from Cabot Corporation and 1.1 weight percent of MT3103 15 nanometers of primary particle size titanium dioxide coated with decylsilane generated from decyltrimethoxysilane from Tayca Corp at 2,740 rpm for about 2 minutes with an 80° F. jacket on a Henschel 10 L FM-10 blender.

The percent of total wax was estimated by differential scanning calorimetry and was found to be 4.6 percent concentration. This indicates that 90 percent of the waxes have been retained in the toner during the process. Wax domain size was estimated, from TEM photo analysis, to be on average 1.2 microns in diameter with a standard deviation of 0.5 micron. Wax diameters from similar comparative toners without the grinding component have a mean value of 5.6 microns with a standard deviation of 2 microns.

Subsequently, there was prepared a developer composition by admixing the aforementioned formulated toner composition mechanically blended at 72° F. at a 3 percent toner concentration, that is 3 parts by weight of toner per 100 parts by weight of carrier comprised of a iron oxide core, 65 microns diameter, with a coating, 0.9 weight percent thereover, of a polyvinylidine fluoride, polymethyl methacrylate and a conductive carbon black, with the ratio of polyvinylidine fluoride to polymethyl methacrylate of about 1 to 3. The mixing of toner and carrier was accomplished in a paint shaker for up to about 30 minutes shaking. The triboelectric charge of the toner could be measured with a Solid State Electrometer (Model 610C obtained from Keithley Instruments). A charge spectrograph analysis of the toner, measured at 100 volts/centimeter, resulted in 4.8 millimeters of total charge distribution. The charge spectrum width of the above prepared toner was about 35 percent to about 52 percent narrower than those of a comparative toner, reference the Comparative Examples. The cohesion of the blended toner was about 10 using a Hosokawa Powder tester. After 30 minute paint shaking, the toner showed only a small increase in percent cohesion, from about 10 to about 45.

Thereafter, the formulated developer composition was incorporated into an electrostatographic imaging device with a toner transporting means, a toner metering charging means, and a development zone as illustrated in U.S. Pat. No. 4,394,429. The printing test was conducted in a continuous mode and the average area coverage of the prints was about 6 percent. About 2,000 sheets of prints were accomplished in each printing test. The print quality, such as solid area density and background grayness, was measured by a reflective densitometer and a visual comparison chart during the printing. The solid area density was about 1.45, which is above the target of 1.40, and the background grayness was about 0.3, which is much lower than the target of below 2. The printing test results and the charge properties are illustrated in Table 1.

EXAMPLE II

In accordance with Example I, there was prepared in an extrusion device, available from Werner Pfleiderer, a toner composition by adding thereto 80 percent by weight of a crosslinked polyester resin (bisphenol A propylene oxide fumarate polymer with 15 to 40 percent gel), 4 percent by weight of the polypropylene wax VISCOL 660P™, available from Sanyo Chemicals of Japan, 1 percent by weight of the polyethylene wax PE130™, available from Hoechst Japan Ltd., 5 percent by weight of REGAL 330® carbon black from Cabot Inc., and 10 percent by weight of FTR6125 isopropenyl toluene-butene/pentene copolymer grinding component obtained from Mitsui Petrochemical Industries, Ltd. of Japan. Relative jetting rates were calculated from collection yields with respect to a control toner, and found to be 2.8. Thereafter, the toner was blended with the surface additives of Example I.

The percent of total wax was estimated by differential scanning calorimetry and was found to be 4.8 percent concentration. This indicates that 95 percent of the waxes have been retained in the toner during the process. Wax domain size was estimated, from TEM photo analysis, to be on average 0.9 microns in diameter with a standard deviation of 0.3 micron.

Subsequently, there was prepared a developer composition by admixing the aforementioned formulated toner at a 3 percent toner with the carrier in Example I. The mixing of toner and carrier was accomplished in a paint shaker for up to about 30 minutes shaking. A charge spectrograph analysis of the toner, measured at 100 volts/centimeter, resulted in 5.0 millimeters of total charge distribution. The charge spectrum width of the above prepared toner was about 30 percent to about 46 percent narrower than those of the Comparative Examples. The cohesion of the blended toner was about 12 using a Hosokawa Powder tester. After 30 minute paint shaking, the toner showed only a small increase in percent cohesion, from about 12 to about 45.

Thereafter, the formulated developer composition was incorporated into a printing test as described in Example I. The solid area density was about 1.42, which is above the target of 1.40, and the background grayness was about 0.25, which is lower than the target of below 2. The printing test results and the charge properties are illustrated in Table 1.

EXAMPLE III

In accordance with Example I, there was prepared in an extrusion device, available from Werner Pfleiderer, a toner composition by adding thereto 82 percent by weight of a styrene-n-butylacrylate resin (styrene to butylacrylate ratio: 80:20, molecular weight $M_w$ 130,000; melt index of 14; glass transition temperature of 59.5° C.), 4 percent by weight of the polypropylene wax VISCOL 660P™, available from Sanyo Chemicals of Japan, 1 percent by weight of the polyethylene wax PE130™, available from Hoechst Japan Ltd., 5 percent by weight of REGAL 330® carbon black from Cabot Inc., and 8 percent by weight of FTR6125 isopropenyl toluene-butene/pentene copolymer as the grinding component obtained from Mitsui Petrochemical Industries, Ltd. of Japan. Relative jefting rates were calculated from collection yields with respect to a control toner, and found to be 2.7. Thereafter, the toner was blended with the surface additives of Example I.

The percent of total wax was estimated by differential scanning calorimetry and was found to be 4.5 percent concentration. This indicates that 90 percent of the waxes have been retained in the toner during the process. Wax domain size was estimated, from TEM photo analysis, to be on average 1.6 microns in diameter with a standard deviation of 0.5 micron.

Subsequently, there was prepared a developer composition by admixing the aforementioned formulated toner at a 3 percent toner with the carrier of Example I. The mixing of toner and carrier was accomplished in a paint shaker for up to about 30 minutes shaking. A charge spectrograph analysis of the toner, measured at 100 volts/centimeter, resulted in 4.9 millimeters of total charge distribution. The charge spectrum width of the above prepared toner was about 33 percent to about 49 percent narrower than those of the Comparative Examples. The cohesion of the blended toner was about 15 using a Hosokawa Powder tester. After 30 minute paint shaking, the toner showed only a small increase in percent cohesion, from about 15 to about 48.

Thereafter, the formulated developer composition was selected for the printing test as described in Example I. The solid area density was about 1.43, which is above the target of at least 1.40, and the background grayness was about 0.25, which is much lower than the target of below 2. The printing test results and the charge properties are illustrated in Table 1.

EXAMPLE IV

In accordance with Example I, there was prepared in an extrusion device, available from Werner Pfleiderer, a toner composition by adding thereto 80 percent by weight of a styrene-n-butylacrylate resin (styrene to butylacrylate ratio: 80:20, molecular weight 130,000; Melt index of 14; glass transition temperature of 59.5° C.), 4 percent by weight of the polypropylene wax VISCOL 660P™, available from Sanyo Chemicals of Japan, 1 percent by weight of the polyethylene wax PE130™, available from Hoechst Japan Ltd., 5 percent by weight of REGAL 330® carbon black from Cabot Inc., and 10 percent by weight of FTR6125 isopropenyl toluene-butene/pentene copolymer as the grinding component obtained from Mitsui Petrochemical Industries, Ltd. of Japan. Relative jetting rates were calculated from collection yields with respect to a control toner, and found to be 2.9. Thereafter, the toner was blended with the surface additives of Example I.

The percent of total wax was estimated by differential scanning calorimetry and was found to be 4.7 percent concentration. This indicates that 94 percent of the waxes have been retained in the toner during the process. Wax domain size was estimated, from TEM photo analysis, to be on average 1.4 microns in diameter with a standard deviation of 0.3 micron.

Subsequently, there was prepared a developer composition by admixing the aforementioned formulated toner at a 3 percent toner with the carrier in Example I. The mixing of toner and carrier was accomplished in a paint shaker for up to about 30 minutes shaking. A charge spectrograph analysis of the toner, measured at 100 volts/centimeter, resulted in 4.5 millimeters of total charge distribution. The charge spectrum width of the above prepared toner was about 44 percent to about 62 percent narrower than those of the Comparative Examples. The cohesion of the blended toner was about 14 using a Hosokawa Powder tester. After 30 minute paint shaking, the toner showed only a small increase in percent cohesion, from about 14 to about 50.

Thereafter, the formulated developer composition was selected for the printing test process as described in Example I. The solid area density was about 1.46, which is above the target of at least 1.40, and the background grayness was about 0.3, which is much lower than the target of below 2. The printing test results and the charge properties are illustrated in Table 1.

COMPARATIVE EXAMPLE 1

There was prepared a toner composition comprised of 82 percent by weight of a branched bisphenol A fumarate, polyester resin, where the estimated level of branched chains is between 5 and 40 percent, 4 percent by weight of the polypropylene wax VISCOL 660P™, available from Sanyo Chemicals of Japan, 1 percent by weight of the polyethylene wax PE130™, available from Hoechst Japan Ltd., 5 percent by weight of REGAL 330® carbon black from Cabot Inc., and 8 percent by weight of AX8840, an ethylene-glycidyl methacrylate copolymer obtained from Elf AtoChem.

The toner product was extruded, jetted, and classified in the same manner as described in Example I. Relative jetting rates were calculated from collection yields with respect to a similar control toner with no grinding agent, and found to be 1.1, which is only 38 percent to 44 percent of the jetting rates of Examples I to IV. This toner was then blended with the same small-sized external additives of Example I.

The percent of total wax was estimated by differential scanning calorimetry and was found to be 4.4 percent concentration. This indicates that 88 percent of the waxes have been retained in the toner during the process, which is slightly less than Examples I to IV. Wax domain size was estimated, from TEM photo analysis, to be on average 1.5 microns in diameter with a standard deviation of 0.5 micron.

Subsequently, there was prepared a developer composition by admixing the aforementioned formulated toner composition mechanically blended at 72° F. at a 3 percent toner concentration, that is 3 parts by weight of toner per 100 parts by weight of carrier comprised of a iron oxide core, 65 microns diameter, with a coating, 0.9 weight percent thereover, of a polyvinylidine fluoride, polymethyl methacrylate and a conductive carbon black, with the ratio of polyvinylidine fluoride to polymethyl methacrylate of about 1 to 3. The mixing of toner and carrier was accomplished in a paint shaker for up to about 30 minutes shaking. The triboelectric charge of the toner was measured throughout with a Solid State Electrometer (Model 610C obtained from Keithley Instruments). A charge spectrograph analysis of the toner, measured at 100 volts/centimeter, resulted in 6.5 millimeters of total charge distribution. The charge spectrum width of the above prepared toner was about 35 percent to about 52 percent broader than those of Examples I to IV. The cohesion of the blended toner was about 30 using a Hosokawa Powder tester. After 30 minute paint shaking, the toner showed only a small increase in percent cohesion, from about 30 to about 75.

Thereafter, the formulated developer composition was selected for the printing test of Example I. The solid area density was only about 1.33, which is below the target of at least 1.40, and the background grayness was about 3, which is much higher than the target of below 2. This indicates that the print quality of this developer dose not meet the requirements.

COMPARATIVE EXAMPLE 2

In accordance with Example I, there was prepared in an extrusion device, available from Werner Pfleiderer, a toner composition by adding thereto 90 percent by weight of a crosslinked polyester resin (bisphenol A propylene oxide fumarate polymer with 15 to 40 percent gel), 4 percent by weight of the polypropylene wax VISCOL 660P™, available from Sanyo Chemicals of Japan, 1 percent by weight of the polyethylene wax PE130™, available from Hoechst Japan Ltd., 5 percent by weight of REGAL 330® carbon black from Cabot Inc. Relative jetting rates were calculated from collection yields with respect to the control toner of Comparative Example 1, and found to be 1.8, which is about 38 percent to 61 percent lower than those in Examples I to IV. Thereafter, the toner was blended with the surface additives of Example I.

The percent of total wax was estimated by differential scanning calorimetry and was found to be 3.0 percent concentration. This indicates that only 60 percent of the waxes have been retained in the toner during the process. Wax domain size was estimated, from TEM photo analysis, to be on average 5.6 microns in diameter with a standard deviation of 2.4 microns.

Subsequently, there was prepared a developer composition by admixing the aforementioned formulated toner at a 3 percent toner with the carrier in Example I. A charge spectrograph analysis of the toner, measured at 100 volts/centimeter, resulted in 7.3 millimeters of total charge distribution. The charge spectrum width of the above prepared toner was about 46 percent to about 62 percent broader than those of the Examples I to IV. The cohesion of the blended toner was about 46 using a Hosokawa Powder tester. After 30 minute paint shaking, the toner showed large increase in percent cohesion, from about 46 to about 80. This indicates that this toner does not have required toner powder flow properties.

Thereafter, the formulated developer composition was selected for the print test of Example I. The solid area density was about 1.25, which is much lower than the target of at least 1.40, and the background grayness was about 3.5, which is much higher than the target of below 2. None of the solid area density and background of this toner meet the requirements. The printing test results and the charge properties are illustrated in Table 1.

Other modifications of the present invention may occur to one of ordinary skill in the art subsequent to a review of the present application, and these modifications, including equivalents thereof, are intended to be included within the scope of the present invention.

TABLE 1

| | Toner Containing Grinding Components and Comparative Toner No Grinding Agent | | | | | | | |
|---|---|---|---|---|---|---|---|---|
| Ex. | Grinding Component (wt. %) | Cohesivity[1] (before/after aging) | Total Wax[2] (wt. %) | Wax domain size[3] (microns) | Relative jetting rate[4] | Solid area density[5] | Back-ground grayness[5] | Charge Spectrum width[6] (mm) |
| I | 8 | 10/45 | 4.6 | 1.2 | 2.5 | 1.45 | 0.3 | 4.8 |
| II | 10 | 12/45 | 4.8 | 0.9 | 2.8 | 1.42 | 0.25 | 5.0 |
| III | 8 | 15/48 | 4.5 | 1.6 | 2.7 | 1.43 | 0.25 | 4.9 |
| IV | 10 | 14/50 | 4.7 | 1.4 | 2.9 | 1.46 | 0.3 | 4.5 |
| COMP. 1 | 0 | 30/75 | 4.4 | 1.5 | 1.1 | 1.33 | 3.0 | 6.5 |
| COMP. 2 | 0 | 40/80 | 3.0 | 5.6 | 1.8 | 1.25 | 3.5 | 7.3 |

[1]Cohesivity was measured by the Hosokawa Powder Tester.

[2]Total wax was measured by using a differential scanning calorimetry. . .

[3]Wax Domain Size was measured by TEM and image analysis.

[4]Relative Jetting Rate was calculated from the yield of toner.

TABLE 1-continued

| Toner Containing Grinding Components and Comparative Toner No Grinding Agent | | | | | | | | |
|---|---|---|---|---|---|---|---|---|
| Ex. | Grinding Component (wt. %) | Cohesivity[1] (before/after aging) | Total Wax[2] (wt. %) | Wax domain size[3] (microns) | Relative jetting rate[4] | Solid area density[5] | Background grayness[5] | Charge Spectrum width[6] (mm) |

[5]Solid Area Density and background were measured by an optical densitometer and a visual comparison chart.
[6]Charge spectrum width was measured by the width of the charge distribution.

What is claimed is:

1. A toner comprised of resin, colorant, grinding compound, and wax.

2. A toner in accordance with claim 1 wherein said wax is comprised of a mixture of waxes.

3. A toner in accordance with claim 1 wherein said wax is comprised of a mixture of from about two to about four waxes.

4. A toner in accordance with claim 1 wherein said wax is comprised of a mixture of from two waxes.

5. A toner in accordance with claim 1 wherein said wax is comprised of a mixture of two waxes, a first wax present in an amount of from about 40 to about 90 weight percent and a second wax present in an amount of from about 10 to about 60 weight percent.

6. A toner in accordance with claim 1 wherein said wax is comprised of a mixture of two waxes, a first wax present in an amount of from about 45 to about 80 weight percent and a second wax present in an amount of from about 20 to about 55 weight percent.

7. A toner in accordance with claim 1 wherein said wax is comprised of a mixture of two waxes of polypropylene and polyethylene.

8. A toner in accordance with claim 7 wherein said polypropylene possesses a weight average molecular weight $M_w$ of from about 5,000 to about 20,000.

9. A toner in accordance with claim 7 wherein said polyethylene possesses an $M_w$ of from about 1,000 to about 10,000.

10. A toner in accordance with claim 7 wherein said polypropylene possesses an $M_w$ of from about 5,000 to about 20,000 and said polyethylene possesses an $M_w$ of from about 1,000 to about 10,000.

11. A toner in accordance with claim 1 wherein said grinding compound is an isopropenyl toluene-butene copolymer or an isopropenyl toluene-pentene copolymer.

12. A toner in accordance with claim 1 wherein said grinding compound is an isopropenyl toluene copolymer with unsaturated hydrocarbons of about 2 to about 8 carbons.

13. A toner in accordance with claim 1 wherein said resin is present in amount of from about 65 to about 85 weight percent and wherein the total of said toner components is about 100 percent.

14. A toner in accordance with claim 1 wherein said resin is present in an amount of from about 70 to about 80 weight percent and wherein the total of said toner components is about 100 percent.

15. A toner in accordance with claim 1 wherein said resin is a styrene acrylate, a styrene methacrylate, or mixtures thereof.

16. A toner in accordance with claim 1 wherein said resin is a polyester.

17. A toner in accordance with claim 1 wherein said resin is an extruded polyester, or a crosslinked polyester.

18. A toner in accordance with claim 1 wherein said grinding agent is present in an amount of from about 3 to about 15 weight percent.

19. A toner in accordance with claim 1 wherein said grinding agent is present in an amount of from about 7 to about 10 weight percent.

20. A toner in accordance with claim 1 wherein said colorant is a pigment, a dye or mixtures thereof.

21. A toner in accordance with claim 1 containing surface additives.

22. A toner in accordance with claim 21 wherein said surface additives are selected from the group consisting of silicas, metal oxides, and fatty acid salts.

23. A toner in accordance with claim 21 wherein said surface additives are selected from a mixture of silicas and titanium oxides.

24. A toner in accordance with claim 21 wherein each of said surface additives are present in an amount of from about 0.5 to about 3 weight percent.

25. A toner in accordance with claim 22 wherein said surface additives are present in an amount of from about 0.5 to about 3 weight percent.

26. A toner in accordance with claim 1 with a negative charge.

27. A toner in accordance with claim 1 further containing surface additives of a coated silica, and wherein said silica has a primary particle size of about 25 nanometers to about 55 nanometers and an aggregate size of about 225 nanometers to about 400 nanometers, and said coating is comprised of a mixture of an alkylsilane and an aminoalkylsilane.

28. A toner in accordance with claim 27 wherein said coating is generated from a mixture of about 10 weight percent to 25 weight percent of an alkylalkoxysilane and about 0.10 weight percent to about 5.0 weight percent of an aminoalkylalkoxysilane.

29. A toner in accordance with claim 1 wherein the resin is a polyester formed by condensation of propoxylated bisphenol A and a dicarboxylic acid.

30. A toner in accordance with claim 1 wherein the resin is comprised of a gelled polyester formed by condensation of propoxylated bisphenol A and fumaric acid.

31. A toner in accordance with claim 1 wherein the colorant is carbon black, cyan, magenta, yellow, red, orange, green, violet, or mixtures thereof.

32. A developer comprised of the toner of claim 1 and carrier.

33. A developer in accordance with claim 32 wherein the carrier is comprised of a core and a polymer coating.

34. A developer in accordance with claim 32 wherein the carrier is comprised of a core and a polymer coating mixture.

35. A developer in accordance with claim 34 wherein said mixture is comprised of two to four polymers.

36. A developer in accordance with claim 34 wherein said mixture is comprised of two polymers.

37. A developer in accordance with claim 34 wherein said mixture is comprised of two to four polymers of polymethylmethacrylate and polyvinylidene fluoride.

38. A developer in accordance with claim 34 wherein said polymer contains a conductive component dispersed therein.

39. A developer in accordance with claim 36 wherein said polymer contains a conductive component dispersed therein in an amount of from about 20 to about 45 weight percent.

40. A developer in accordance with claim 36 wherein said polymer contains a conductive component dispersed therein in an amount of from about 20 to about 65 weight percent and which component is carbon black.

41. A developer in accordance with claim 32 with a conductivity of from about $10^{-6}$ to about $10^{-10}$ $(\text{ohm-cm})^{-1}$ and a breakdown potential of no more than 500 volts and, for example, from about 10 volts to about 500 volts.

42. A developer in accordance with claim 32 with a preferred conductivity of from about $10^{-7}$ to about $10^{-9}$ $(\text{ohm-cm})^{-1}$.

43. A process for the preparation of a toner comprising admixing resin, colorant, wax, and grinding compound.

44. A process which comprises the formation of an image on an imaging member, and the development of said image with the toner of claim 1 and transferring the image to a substrate.

45. A process which comprises the formation of an image on an imaging member, and the development of said image with the developer of claim 33 and transferring the image to a substrate.

46. A toner in accordance with claim 12 wherein said isopropenyl toluene is meta isopropenyl toluene, ortho isopropenyl toluene, para isopropyl toluene or mixtures thereof.

47. A toner in accordance with claim 12 wherein said hydrocarbon is butene, pentene, hexene, isopropylene, or butadiene.

48. A toner in accordance with claim 1 wherein said grinding component is an alkyl aryl polymer.

49. A toner in accordance with claim 1 wherein said grinding component is polyalkenyl alkyl.

* * * * *